Patented June 27, 1950

2,512,667

UNITED STATES PATENT OFFICE 2,512,667

LINEAR NITROGEN-CONTAINING POLYMERS

Robert Wighton Moncrieff, Borrowash, near Derby, England, assignor, by mesne assignments, to Celanese Corporation of America, a corporation of Delaware No Drawing. Application August 4, 1945, Serial No. 609,031. In Great Britain May 10, 1945

15 Claims. (Cl. 260—2)

This invention relates to improvements in the production of polymeric materials, and is more particularly concerned with the production of polymers suitable for the formation of filaments, films and plastic materials.

I have found that valuable new polymers may be produced by the heat treatment of dihydrazides of dicarboxylic acids. The products appear to be linear polymers containing in the structural unit the 4-amino-1,2,4-triazole nucleus. They are not in general hydrolysable by hydrochloric acid, as is the case with the known polyamides, and generally they exhibit very considerable stability. Moreover, some of them, and notably the polymer from sebacic dihydrazide, have melting points which render them eminently suitable for the production of filaments for use in textile materials. The polymer from sebacic dihydrazide has a melting point of the order of 250° C., which is above the usual ironing temperature for textile fabrics, and yet permits of the polymer being spun into filaments from the melt.

The invention includes making the new polymers from any dicarboxylic acids which contain two carboxylic acid groups as the sole substituent radicles in the hydrocarbon chain, for example succinic acid, glutaric acid, adipic acid, pimelic acid, suberic acid, azelaic acid, sebacic acid and the higher dicarboxylic acids of this series, diphenic acid, phenylene 1,4-diacetic acid and similar dicarboxylic acids of the aromatic series. Preferably polymethylene dicarboxylic acids such as those mentioned above are used. However, the invention does not exclude the use of dicarboxylic acids containing substituents or hetero atoms which do not interfere with the reaction, for example diglycollic acid, N-methyl-imino-diacetic acid and similar dicarboxylic acids containing unreactive atoms in the chain. Instead of using the dicarboxylic acid dihydrozide, a mixture of a dicarboxylic acid diester with the appropriate amount of hydrazine may be used. For example, the methyl, ethyl or phenyl esters are all very suitable for the purpose of the present invention. Indeed the dihydrazides can readily be made from the diesters and hydrazine hydrate.

The structural unit of the polymers appears to have the general formula

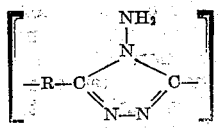

where R is a divalent organic radicle, which is free from reactive groups, contains two terminal carbon atoms and is joined to the triazole rings through said terminal carbon atoms. In the case of using hydrazides of polymethylene dicarboxylic acids this structural unit reduces to the form

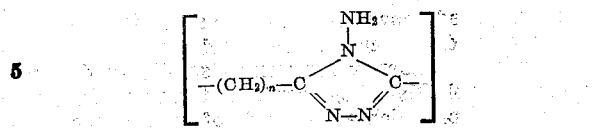

where $n$ is the number of methylene groups in the dicarboxylic acid. As explained below, the hydrogen atoms of the 4-amino group may be replaced by organic radicles by a suitable after-treatment or by using suitable raw materials already substituted.

The condensation may, as indicated, be carried out by simple heating. Usually temperatures of the order of 200–300° C., and especially 230–280° C., are suitable for the purpose. The heating may be carried out on the undiluted dihydrazide, or the dihydrazide may be suspended or dissolved in a suitable diluent. It has been found that the presence of water is very beneficial, at least in the initial stages of the condensation, since it appears to prevent or retard a tendency for the polymer to become resinous and insoluble, possibly by cross-linking or some other side reaction. In addition it has been found that the presence of an additional amount of hydrazine over and above that necessary to form the dihydrazide is of great benefit in obtaining polymers of the desired 4-amino-triazole structure. It appears probable that the dihydrazides exhibit some tendency to lose hydrazine during the condensation, and that the presence of additional hydrazine in the reaction vessel restrains this tendency or compensates for any such loss of hydrazine. It is most advantageous to employ this excess of hydrazine in the form of hydrazine hydrate or an aqueous solution of hydrazine hydrate, since this provides both the hydrazine and the water. The condensation is preferably carried out, at least in the initial stages, in a closed vessel, though in the later stages the pressure that builds up may be wholly or in part released, and further, towards the end of the condensation, the pressure may be reduced to below atmospheric pressure, for example down to a pressure of 10 or even 5 mms. of mercury. This final reduction of pressure to below atmospheric pressure is not, however, necessary, and it is most convenient to carry out the whole condensation in a closed vessel with periodic or continuous release of pressure, for example a release of pressure down to 50 lbs. per square inch. In the case of starting with a dicarboxylic acid ester and hydrazine, the excess of hydrazine is provided by starting with rather more than 2 moles of hydrazine to 1 of dicarboxylic acid. When starting from the dihydrazide, the excess of hydrazine is preferably at least 10% of the weight of the dihydrazide.

A similar excess over two moles of hydrazine may be used when starting from a diester and hydrazine.

While the invention includes the production of polymers of relatively low molecular weight, it is mainly addressed to the production of polymers which have film- and filament-forming properties. It is found that the ability to form filaments usually sets in when an intrinsic viscosity of 0.3–0.4 is reached, as measured in a 1% solution of the polymer in meta-cresol. For the best filaments the condensation is best carried to an intrinsic viscosity of at least 0.6, at which stage filaments made from the polymers usually exhibit cold-drawing properties, with consequent increase in their tensile strength measured in grams per denier.

As indicated above, the polymers are extremely stable to hydrolysing agencies and hence there is very little tendency for their viscosity to decrease. Probably they contain terminal hydrazide groups which are capable of further condensation. Such a tendency to further condensation may be eliminated, or in other words the viscosity of the polymer may be stabilised, by hydrolysing these terminal hydrazide groups. For example the polymer may be heated with an aqueous solution of hydrochloric acid or any other suitable mineral acid to split off the hydrazine at the ends of the chains and thus constitute carboxylic acid groups as the terminal groups. The polymer is then obtained in the form of a hydrochloride or similar salt, and the base may be recovered therefrom by suitable neutralisation of the acid. The polymer then appears to be completely stable as regards its viscosity. When sufficient hydrazine has been included in the original condensation mixture to ensure that all the structural units contain the aminotriazole nucleus, the polymer thus produced probably has the structure

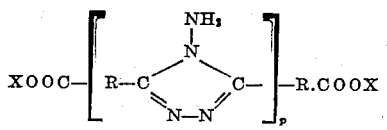

where R is a divalent organic radicle, $p$ is the degree of polymerisation and X is hydrogen or a metal or other salt-forming base. A further possibility of securing a viscosity-stable polymer is to include in the mixture before condensation, or to add to the mixture after condensation, an agent which will combine with or otherwise render ineffective the terminal acid hydrazide groups. Hydrazides of monobasic acids, for example acetyl hydrazide, or longer chain hydrazides, such as lauryl hydrazide, provide one means of securing this end, though it is probable that some of the acetyl, lauryl or similar monobasic acid residues will appear attached to the amino groups in the triazole rings in the polymer chain. Indeed it is possible to form N-acidylated poly-4-aminotriazoles by using part of the hydrazine in the original mixture in the form of a monobasic acid hydrazide. Up to 1 molecule out of the 2 moles of hydrazine theoretically necessary for the production of a polyaminotriazole may be thus replaced by a monobasic acid hydrazide for each mole of dicarboxylic acid used. Monobasic acid amides, for instance laurylamide and acetamide, may likewise be used for the purpose of viscosity stabilisation.

The polymers may be aftertreated in a number of ways for the purpose of modifying their properties, for example increasing their melting points or decreasing their moisture regain, or even of rendering them completely insoluble in organic solvents. Generally the polymers as made are insoluble in water and acetone, and soluble in phenolic solvents, such as phenols, cresols, xylenol and the like, and soluble in formic acid and acetic acid. The polymers may be aftertreated with acylating agents, for example formic acid reacted at water-bath temperature, or acetyl chloride applied at much the same temperature, or phenyl, naphthyl or other isocyanate reacted in boiling benzene or similar solvent, phenyl and other isothiocyanate reacted under similar conditions, or isocyanic acid or isothiocyanic acid. These two latter are preferably applied in the form of alkali salts to the hydrochloride of the polymer. Other acylating agents include cyanamide, which converts the amino group into a guanidine group, and alkyl, aryl or aralkyl cyanamides. The polymers so produced probably contain the structural unit

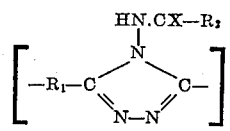

where $R_1$ is a divalent organic radicle, X is an atom of oxygen or sulphur or an imino group =NH and $R_2$ is an organic radicle or an amino or substituted amino group. With the above reagents $R_2$ is monovalent. However it may be a di- or polyvalent radicle. By employing an acidylating agent which contains two or more acidylating groups, the polymer may be rendered infusible and insoluble in all organic solvents. Such agents include di- and poly-carboxylic acids, di- and poly-isocyanates and di- and poly-isothiocyanates. In a similar way the polymers may be aftertreated with carbonyl compounds, including both aldehydes and ketones, for example formaldehyde, acetaldehyde, benzaldehyde, acetophenone, furfural and the like. Here again reagents may be used which contain two or more reactive groups, for example dialdehydes, diketones, aldehydo-ketones, aldehydo-carboxylic acids or ketocarboxylic acids, e. g. levulinic acid.

The polymers treated with carbonyl compounds probably contain the structural unit

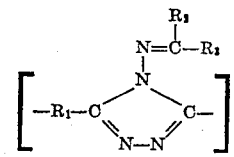

where $R_1$ is a divalent organic radicle, $R_2$ is hydrogen or a monovalent organic radicle depending on whether an aldehyde or ketone is used, and $R_3$ is a mono-, di- or poly-valent organic radicle depending on whether a mono, di- or poly-valent carbonyl compound is used. It will be appreciated that both with the acidylating agents and with the carbonyl compounds, reaction may take place with a small proportion or a large proportion of the amino groups disposed along the polymer chain. The polymers so treated thus contain both modified and unmodified structural units.

Insolubilising treatments carried out with reagents containing two or more reactive groups are preferably applied to the polymers after they have been shaped, for example formed into filaments, films or the like.

The following examples illustrate the invention but are not to be considered as limiting it.

Example I

A mixture of 100 parts by weight of sebacic dihydrazide, 2 parts by weight of acetic hydrazide, and 80 parts by weight of water are heated in a Staybrite autoclave at 230° C. for 3 hours, the pressure being released continuously so as to maintain it at 50 lbs. per square inch. At the end of the 3 hours the intrinsic viscosity of the polymer is about 0.3–0.35, and the polymer is already fibre-forming. The low polymer thus formed is then heated for a further half an hour at 230° C. under a pressure of 10 mms. The product then has an intrinsic viscosity of the order of 0.75, and readily forms fibres which can be cold-drawn.

Example II 100 parts by weight of sebacic hydrazide are heated with 19.5 parts by weight of hydrazine in the form of an aqueous solution containing 50% hydrazine hydrate in an autoclave for half an hour at 220° C., for 2 hours at 260–270° C., the autoclave being kept closed throughout these operations and finally for half an hour at 260–270° C., during which time the pressure is gradually reduced to 50 lbs. per square inch. The polymer, which has a melting point of about 250° C., yields long lustrous filaments from the melt which can be cold-drawn. Its intrinsic viscosity is about 0.6.

Example III 100 parts by weight of sebacic dihydrazide and 30 parts by weight of hydrazine in the form of an aqueous solution containing 90% of hydrazine hydrate are heated in an autoclave for 2 hours at 220° C., and for a further 2 hours at 260° C. The product, which yields long filaments from the melt, has an intrinsic viscosity of about .52, a melting point of about 255° C., and a nitrogen content of 28.2%.

Example IV 100 parts by weight of sebacic hydrazide and 7.8 parts of hydrazine in the form of an aqueous solution containing 50% of hydrazine hydrate are heated in an autoclave for 1 hour at 220° C., the pressure then released to 200 lbs. per square inch, the temperature rapidly raised to 260° C. and maintained at that figure for a further 2 hours whilst stabilising the pressure at 200 lbs. per square inch by periodic release. The product, which has good fibre-forming properties, has an intrinsic viscosity of 0.75.

Example V 100 parts by weight of suberic dihydrazide are heated with 19.5 parts by weight of hydrazine in the form of an aqueous solution containing 50% of hydrazine hydrate in an autoclave for 2 hours at 220° C. At the end of this period, the product has a melting point of 253° C., an intrinsic viscosity of 0.4 and a nitrogen content of 33.8%. The product is then further heated for ¼ hour at 280° C. under a pressure of 5 mms. of mercury. It is then capable of yielding long filaments and has a melting point of 292–294° C.

The polymer from azelaic dihydrazide has a melting point of the order of 234° C., that from adipic dihydrazide a melting point of 280° C., and that from succinic dihydrazide a melting point above 360° C. These polymers are formed by methods similar to those given in the above examples for sebacic and suberic dihydrazides. In a similar way the diesters of dicarboxylic acids may be condensed with hydrazine.

As already indicated, a characteristic of the polyamino-triazoles of the present invention is their extraordinary resistance to hydrolysing agencies. In particular, their viscosity in meta-cresol is substantially unaffected by boiling them with dilute or concentrated hydrochloric acid for 3 hours.

The polymers are substantially water-insoluble. On boiling with hydrochloric acid, as mentioned above, they yield a hydrochloride of a polymer in which the hydrochloric acid content is less than half the amount of hydrochloric acid which is equivalent to their nitrogen content. (Theoretically, in a pure poly-4-amino-1,2,4-triazole which contains no nitrogen other than that in or attached to the triazole ring, the hydrochloric acid content, neglecting terminal amino groups for the polymer, would be equivalent to one-quarter of the nitrogen content; that is to say, for each 56 grams of nitrogen present, there would be present 36.5 grams of hydrochloric acid in the hydrochloride.) Generally the polymers are water-insoluble and the most valuable ones are those in which the links joining the triazole rings are such that the total nitrogen content of the polymer is more than 15%.

The invention includes the production of filaments, films and other articles from the polymers produced as described above. Generally the most suitable method of producing filaments is by melt spinning, i. e. by extruding a melt of the polymer through suitable orifices. In general the temperature of the polymer to be extruded should be some 10–30° above the melting point of the polymer. This melting temperature may be modified to some extent, e. g. with a view to reducing any tendency to decomposition during spinning at very high temperatures, by mixing the polymer with suitable proportions of plasticisers, for example sulphonamide plasticisers, phenolic plasticisers, urea and thiourea plasticisers and the like. Such plasticisers may either be left in the products or may be partially or completely extracted therefrom. Filaments may also be produced by wet or dry spinning methods from solutions in suitable solvents, for example formic acid or acetic acid or the phenolic solvents referred to above.

The filaments so formed may, if the polymer be of sufficiently high molecular weight, be drawn out at comparatively low temperatures, or even at atmospheric temperature, to very fine filaments having high tenacity and good elasticity. The resulting filaments may then be used for any of the purposes to which artificial silks have in the past been applied. Generally the products have an affinity for the dispersed insoluble type of dyestuff now generally applied to cellulose acetate, while those in which the 4-amino group has not been modified or in which only a proportion of such amino groups has undergone modification exhibit a good affinity for the acid wool colours.

While the invention is especially directed to the manufacture and application of fibre-forming polymers, it is not limited thereto and embraces the production of similar polymers suitable, for example, for use as softening agents, coatings, film-forming substances, and the like. Moreover, for these applications the polymers of the present invention may be mixed with other fibre-forming, film-forming or lacquer substances or other ingredients, for example cellulose acetate, aceto-butyrate, butyrate and aceto-stearate, ethyl cellulose, oxyethyl cellulose, oxyethyl cellulose acetate, benzyl cellulose and other cellulose derivatives, plasticizers or softening agents, dyestuffs, pigments and the like.

Having described my invention, what I desire to secure by Letters Patent is:

1. Process for the production of nitrogen-containing polymers, which comprises heating a dihydrazide of a dicarboxylic acid free from reactive groups other than the carboxy groups with sufficient hydrazine to produce a polymer resistant to hydrolysis by hydrochloric acid, and continuing the heating until the polymer is produced.

2. Process for the production of nitrogen-containing polymers, which comprises heating a diester of a dicarboxylic acid free from reactive groups other than the carboxy groups with more than two molecular proportions of hydrazine to produce a polymer resistant to hydrolysis by hydrochloric acid and continuing the heating until the polymer is produced.

3. Process for the production of nitrogen-containing polymers, which comprises heating at a temperature sufficient to liberate free hydrazine from a monocarboxylic acid hydrazide a dihydrazide of a dicarboxylic acid free from reactive groups other than the carboxy groups with a sufficient quantity of a hydrazide of a monocarboxylic acid free from reactive groups other than the carboxy group to produce a polymer resistant to hydrolysis by hydrochloric acid, and continuing the heating until the polymer is produced.

4. Process for the production of nitrogen-containing polymers, which comprises heating a dihydrazide of a dicarboxylic acid free from reactive groups other than the carboxy groups with sufficient hydrazine to produce a polymer resistant to hydrolysis by hydrochloric acid, and continuing the heating until the polymer is produced, at least the initial heating being carried out in the presence of water.

5. Process for the production of nitrogen-containing polymers, which comprises heating a dihydrazide of a polymethylene dicarboxylic acid free from reactive groups other than the carboxy groups with sufficient hydrazine to produce a polymer resistant to hydrolysis by hydrochloric acid, and continuing the heating until the polymer is produced.

6. Process for the production of nitrogen-containing polymers, which comprises heating a diester of a polymethylene dicarboxylic acid free from reactive groups other than the carboxy groups with more than two molecular proportions of hydrazine to produce a polymer resistant to hydrolysis by hydrochloric acid, and continuing the heating until the polymer is produced.

7. Process for the production of nitrogen-containing polymers, which comprises heating a dihydrazide of a dicarboxylic acid free from reactive groups other than the carboxy groups with sufficient hydrazine to produce a polymer resistant to hydrolysis by hydrochloric acid, and continuing the heating until the polymer has fibre-forming properties.

8. Process for the production of nitrogen-containing polymers which comprises heating a diester of a dicarboxylic acid free from reactive groups other than the carboxy groups with more than two molecular proportions of hydrazine to produce a polymer resistant to hydrolysis by hydrochloric acid, and continuing the heating until the polymer has fibre-forming properties.

9. Process for the production of nitrogen-containing polymers, which comprises heating a dihydrazide of a polymethylene dicarboxylic acid free from reactive groups other than the carboxy groups with sufficient hydrazine to produce a polymer resistant to hydrolysis by hydrochloric acid, and continuing the heating until the polymer has fibre-forming properties.

10. Process for the production of nitrogen-containing polymers, which comprises heating sebacic dihydrazide with sufficient hydrazine to produce a polymer resistant to hydrolysis by hydrochloric acid, and continuing the heating until the polymer is produced.

11. Process for the production of nitrogen-containing polymers, which comprises heating sebacic dihydrazide with water and sufficient hydrazine to produce a polymer resistant to hydrolysis by hydrochloric acid, and continuing the heating until the polymer is produced.

12. Process for the production of nitrogen-containing polymers, which comprises heating sebacic dihydrazide with sufficient hydrazine to produce a polymer resistant to hydrolysis by hydrochloric acid, and continuing the heating until the polymer has fibre-forming properties.

13. Linear nitrogen-containing polymers characterized by being substantially resistant to the hydrolyzing action of boiling hydrochloric acid, and consisting of structural units of the general formula

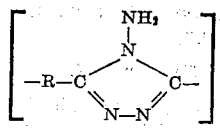

where R is a divalent organic radicle free from reactive groups and having two terminal carbon atoms and R is joined to the triazole rings through said terminal carbon atoms.

14. Linear nitrogen-containing polymers characterized by being substantially resistant to the hydrolyzing action of boiling hydrochloric acid, and consisting of structural units of the general formula

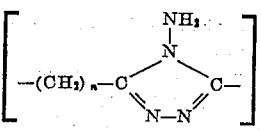

where $n$ is an integer having a value of at least 2.

15. Linear nitrogen-containing polymers characterized by being substantially resistant to the hydrolyzing action of boiling hydrochloric acid, and consisting of structural units of the general formula

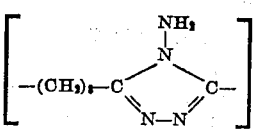

ROBERT WIGHTON MONCRIEFF.

REFERENCES CITED

The following references are of record in the file of this patent:

UNITED STATES PATENTS

| Number | Name | Date |
|---|---|---|
| 2,218,077 | Zerweck et al. | Oct. 15, 1940 |
| 2,332,303 | D'Alelio | Oct. 19, 1943 |
| 2,349,979 | Moldenhauer et al. | May 30, 1944 |
| 2,395,642 | Prichard | Feb. 26, 1946 |